(12) United States Patent
King et al.

(10) Patent No.: US 6,500,334 B1
(45) Date of Patent: Dec. 31, 2002

(54) STAND ALONE WATER PURIFIER

(76) Inventors: Joseph A. King, 142 Chevy Chase Dr., Wayzata, MN (US) 55391; Jeffrey D. Johnson, 5516 24th Ave., South Minneapolis, MN (US) 55417

(*) Notice: Subject to any disclaimer, the term of this patent is extended or adjusted under 35 U.S.C. 154(b) by 0 days.

(21) Appl. No.: 09/628,637

(22) Filed: Jul. 31, 2000

(51) Int. Cl.$^7$ .................................................. C02F 1/00
(52) U.S. Cl. ..................... 210/205; 210/206; 210/209; 210/237; 422/243
(58) Field of Search ............................. 210/198.1, 205, 210/206, 209, 237; 422/243

(56) References Cited

U.S. PATENT DOCUMENTS

| | | |
|---|---|---|
| 3,306,448 A | 2/1967 | Baker |
| 3,347,211 A | 10/1967 | Falkenberg et al. |
| 3,390,695 A | 7/1968 | King et al. |
| 3,567,020 A | 3/1971 | Whitaker |
| 3,616,918 A | 11/1971 | Simsbury et al. |
| 3,677,408 A | 7/1972 | Dinizo, Jr. |
| 3,693,800 A | 9/1972 | Stanfield et al. |
| 3,841,487 A | 10/1974 | Villette |
| 3,864,262 A | 2/1975 | Lang et al. |
| 3,899,425 A | 8/1975 | Lewis |
| 3,970,556 A | 7/1976 | Gore |
| 4,022,690 A | 5/1977 | Smith |
| 4,126,925 A | 11/1978 | Jacuzzi |
| 4,212,740 A | 7/1980 | Greene |
| 4,348,281 A | 9/1982 | Perry et al. |
| 4,388,192 A | 6/1983 | Hellqvist |
| 4,426,286 A | 1/1984 | Puckett et al. |
| D280,757 S | 9/1985 | Paulovich et al. |
| 4,546,503 A | 10/1985 | Casberg |
| 4,606,893 A | 8/1986 | Sangster |
| 4,637,873 A | 1/1987 | DeSousa et al. |
| 4,643,881 A | 2/1987 | Alexander et al. |
| 4,798,670 A | 1/1989 | Treene |

(List continued on next page.)

FOREIGN PATENT DOCUMENTS

| | | |
|---|---|---|
| EP | 0 555 600 A | 8/1993 |
| GB | 2231041 | 7/1990 |
| LU | 40 774 A | 1/1962 |

Primary Examiner—Betsey Morrison Hoey
(74) Attorney, Agent, or Firm—Jacobson & Johnson

(57) ABSTRACT

A water purification device, method and system with the water purification device having a container for holding a water purification material therein with the water purification device including a shroud extending in a direction generally normal to a flow of debris laden water with the shroud inhibiting direct flow of debris into a water inlet in the water purification device by directing water and debris over the shroud and around the water purification device while a portion of the water can be directed laterally into the water purification material within the water purification device to thereby purify the water that flows over the water purification materials with the water purification device including multiple spaced and positioned water inlets so that the likelihood of the water inlet being completely obstructed is remote.

26 Claims, 5 Drawing Sheets

U.S. PATENT DOCUMENTS

| | | |
|---|---|---|
| 4,867,196 A | 9/1989 | Zetena et al. |
| 4,917,868 A | 4/1990 | Alexander et al. |
| 5,053,205 A | 10/1991 | Taylor et al. |
| 5,055,183 A | 10/1991 | Buchan |
| 5,059,316 A | 10/1991 | Renton |
| 5,064,535 A | 11/1991 | Hsu |
| 5,124,032 A | 6/1992 | Newhard |
| 5,225,074 A | 7/1993 | Moini |
| 5,234,588 A | 8/1993 | Aymes |
| 5,251,656 A | 10/1993 | Sexton, Sr. |
| D344,614 S | 2/1994 | Cheng |
| 5,350,512 A | 9/1994 | Tang |
| 5,407,567 A | 4/1995 | Newhard |
| 5,433,867 A | 7/1995 | Kisner |
| 5,441,711 A | 8/1995 | Drewery |
| 5,476,116 A | 12/1995 | Price et al. |
| D371,824 S | 7/1996 | Price et al. |
| 5,662,795 A | 9/1997 | Pickens et al. |
| 5,672,271 A | 9/1997 | Dye |
| 5,779,913 A | 7/1998 | Denkewicz et al. |
| 5,830,350 A | 11/1998 | Voss et al. |
| 5,879,932 A | 3/1999 | Van Erdewyk et al. |
| 5,888,386 A | 3/1999 | Enright et al. |
| 5,979,300 A | 11/1999 | Donovan |
| 6,019,893 A | 2/2000 | Denkewicz et al. |
| 6,071,403 A | 6/2000 | Usher | ns
STAND ALONE WATER PURIFIER

FIELD OF THE INVENTION

This invention relates generally to water purification and more specifically to a water purification device and method for purifying water in a stream of water that may contain debris.

BACKGROUND OF THE INVENTION

One of the difficulties with treatment of water in the skimmer basket region of a pool or spa is that the water treatment device becomes clogged with debris. One prior art approach is shown in U.S. Pat. No. 5,124,032 where the canister that holds chlorine is maintained above or along side the skimmer basket. Another approach is shown in U.S. Pat. Nos. 5,779,913 and 6,019,893 which shows a dispenser that is secured to the underside of a skimmer basket. While not holding water purification materials U.S. Pat. No. 5,830,350 discloses a pool skimmer basket that includes a central member that projects above the top of the skimmer basket in order to prevent the basket from becoming clogged and thus preventing flow therethrough. Thus, the placement of water purification devices in a skimmer basket is generally avoided because of clogging problems.

The present invention provides a water purification device that can be positioned in a skimmer basket and in the flow of water with debris with the water purification device maintaining the water inlet to the water purification device in a condition wherein water can continue to be directed through the water purification device even though there is a continual presence of debris in the water flowing around the water purification device.

BRIEF DESCRIPTION OF THE PRIOR ART

U.S. Pat. No. 5,830,350 discloses a pool skimmer basket with a central core projecting above the top of the skimmer basket.

U.S. Pat. No. 5,124,032 discloses a swimming pool chlorinator that is maintained above the bottom of the skimmer basket.

U.S. Pat. Nos. 6,019,893 and 5,779,913 disclose a water purification device that is secured to the underside of the skimmer basket.

SUMMARY OF THE INVENTION

A flow-through, water purification device, method and system with the water purification device comprising a container for holding a water purification material therein with the water purification device including a shroud extending in a direction generally normal and lateral to a flow of debris laden water with the shroud inhibiting direct flow of debris into a water inlet in the water purification device by directing water and debris over the shroud and around the water purification device while a portion of the water is directed laterally into and through the water purification device and a further portion is directed through water purification material within the water purification device to thereby purify the water that flows over the water purification materials. A shielded exit located below the water purification devices maintains a portion of the skimmer basket free of debris to thereby provide a path for water to continually flow through the water purification device. The water purification device can also include multiple spaced and laterally positioned water inlets so that the likelihood of the water inlet being completely obstructed by debris is remote.

DESCRIPTION OF THE PREFERRED EMBODIMENT

Figure 1:
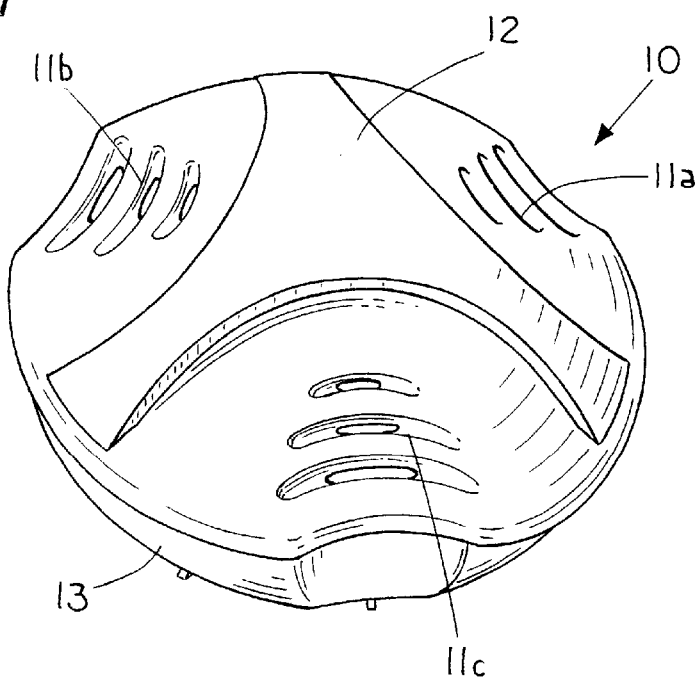
FIG. 1 is a perspective view of the water purification device of the present invention.

FIG. 1 is a perspective view of the water purification device 10 with the water purification device having a general spherical shape with a cover 12 which is also suitable for use as a handle for removing and replacing the water purification device when the water purification material is spent or the skimmer basket is removed for cleaning. That is, cover 12 is spaced sufficiently far from shroud 11 so that a user can insert his or her fingers beneath the cover to lift the water purification device free of the skimmer basket.

A shroud 11 extends radially outward to extend circumferentially over a container 13 located thereunder. Shroud 11 includes a first set of shroud water inlets 11a, a second set of shroud water inlets 11b and a third set of shroud water inlets 11c for directing water into container 13. Each of the individual water shroud inlets have an arcuate shape and each of the water inlets includes at least three water inlet ports with the apex of each of the arcuate shroud water inlets located at the highest vertical position of the shroud inlet. The shroud inlets together with the shroud as will be described herein provide for flushing debris away from the shroud inlets.

Figure 2:
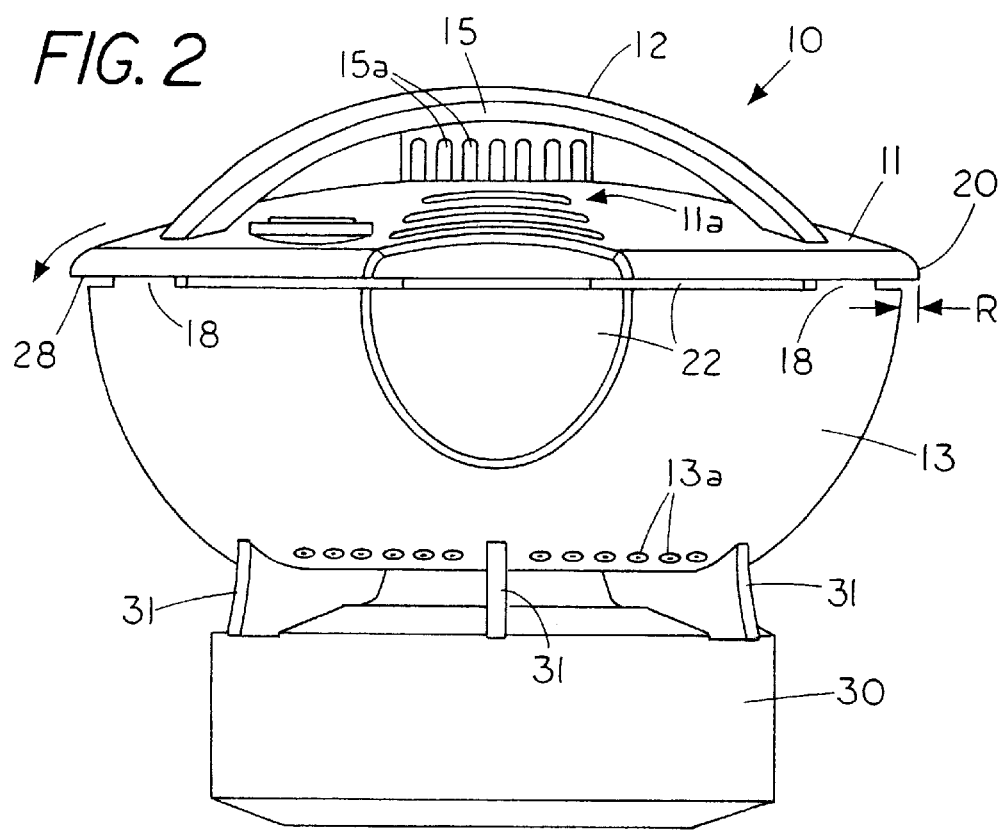
FIG. 2 is a front view of the water purification device shown in FIG. 1 with the water purification device positioned on a puck.

FIG. 2 is a front view of the water purification device 10 with the water purification device positioned on a puck 30 comprising a bacteria killing chemical such as bromine or chlorine. In the operative position the water purification device can handle two different and distinct water treatment products while maintaining the flow of water into contact with both materials to thereby ensure that the water can be rid of unwanted bacteria or algae.

Water purification device 10 is shown with shroud 11 extending radially outward over container 13 a distance denoted by R. Shroud 11 forms a lateral top shield for a circumferential water inlet 22 formed between container 13 and cover 11. That is, a set of tabs 18 connect and hold shroud 11 in a spaced condition from container 13 so that water can flow laterally in the circumferential inlet 22 located around the periphery of water purification device 10. The purpose of having shroud 11 extend beyond the periphery of container 13 is to enable the shroud to carry water and debris that impinges normally on water purification device to be carried past the lateral shielded water inlets 22. The arrow indicates the direction of water flow as the water flows over circumferential edge 20 of the shroud 11. However, since the water itself will tend to be drawn backward to the underside side 28 of shroud 11 by the Coanda effect water will be directed laterally inward into container 13 though inlet 22. Consequently, for debris to enter circumferential inlet 22 would require that the debris make an abrupt change in direction to flow into the circumferential inlet. Consequently, the momentum of the debris causes it to separate from the flow of water and be carried past circumferential inlet 22. Thus circumferential water inlets 22 provide one path for ingress of water into water purification device 10 while inhibiting debris from entering therein.

Figure 3:
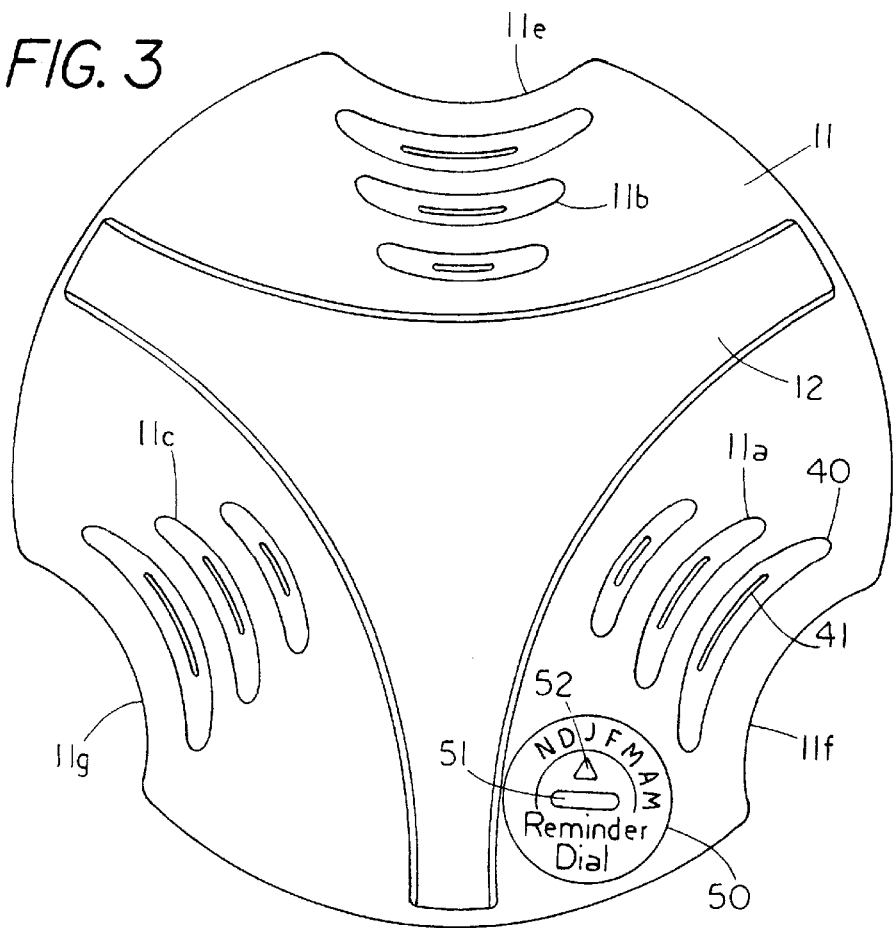
FIG. 3 is a top view of the water purification device shown of FIG. 1.

Located on the top portion of water purification device 10 is a cylindrical extension 15 that extends vertically upward from shroud 11 to the underside of cover 12. FIG. 3 illustrates that the cylindrical extension 15 is shielded by cover 11. Locate within cylindrical extension 15 is a set of circumferentially spaced elongated slots 15a that communicate with an interior chamber of water purification device 10. Elongated slots 15a provide a primary water inlet of water into the water purification device 10 while the cover 12 shields the water inlets from clogging with debris by extending laterally past the elongated openings to thereby inhibit debris from entering water inlets 15a.

The positioning of water inlet 15a at the top of the water purification device provides a two-fold purpose. First, it allows water to flow into the water purification device and passage 60 even if the debris in the skimmer begins to build to a height sufficient to cover the skimmer basket. That is, if the debris builds up around the periphery of the water purification device 10 it creates a greater resistance for water flow around the water purification device 10. Consequently, if any water can still flow through the skimmer basket loaded with debris the water will continue to flow in the path of least resistance which is through the center of the water purification device and through passage 60. Thus, the system operates to purify water even if the skimmer basket becomes filled with materials. Of course it is good practice not to allow the skimmer basket to be become completely filled as one should periodically empty the skimmer basket. Second, it allows water to flow into the water purification materials in the water purification device even though the skimmer basket may be filling up with debris.

In the embodiment shown a set of legs 31 support the water purification device 30 on top of puck 30 with a water discharge outlet formed in the space between the underside of water purification device 10 and puck 30. If puck 30 rests on the bottom of the skimmer basket the water flowing through the water purification device 10 will be able to released into the water since the radially extending shroud and container 13 shield the water outlet from the container from debris.

A further feature of the water purification device is that water purification maintains a debris free footprint on the bottom of the skimmer basket That is, container 13 which is supported on legs 13 occupies a circular space over the bottom of the skimmer basket to prevent debris from falling into a circular area on the bottom of the skimmer basket and thereby completely clogg the bottom of the skimmer basket with debris.

FIG. 3 is a top view of the water purification device 10 showing cover 12 with portions of cover 12 extending radially outward in three different directions. The cover 12 completely shields the water inlet 15a (FIG. 2) from the normal flow direction. It is noted that the set of shroud water inlets 11a, 11b and 11c are not shielded by cover 12 but are spaced radially outward on shroud 11 with each of the water inlets having a curved recess that surrounds the port therein. For purposes of description only one of the shroud ports and inlets will be described however, the others have similar shapes. Reference numeral 40 identifies an arcuate shaped recess 40 with an arcuate shaped port 41 positioned centrally therein at the bottom of the arcuate shaped recess 40. The purpose of having the port 40 located below the plane of the shroud is so that any debris that might block the opening 41 would not be able to come into direct contact with port 41 thereby allowing a continuing flow of water to channel or wash any debris off the smooth dome shape of shroud 11.

While flow is directed over the surface of the dome shaped shroud 11 there are include a set of scallops for funneling the water around the water purification device. As each of the scallops are identical only one with be described herein. A scallop 11f is located in water purification device 10 to provides a larger area for water to flow past the shroud As a result water tends to funnel laterally into the scallop 11f and over the recessed areas of the shroud inlets thereby producing a washing action over the set of shroud water inlets 11a to thereby inhibit debris in the water from blocking or obstructing the shroud water inlets 11a, 11b and 11c. It is apparent that in the present invention each of the water inlets includes either an obstruction or a flow diverter to inhibit debris from blocking the water inlets.

Located on the top side of water purification device 11 is a reminder dial that contains an outer section listing symbols that correspond to the month of the year and an interior rotatable dial 51 that can be rotated so that pointer 52 points to the month that the water purification device 10 should be replaced.

Figure 4:
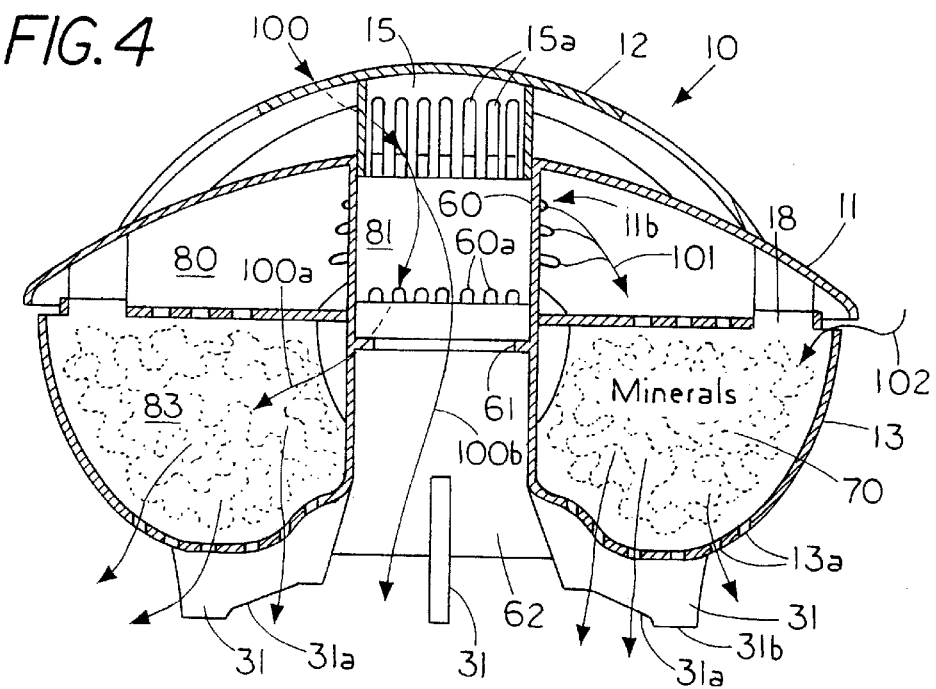
FIG. 4 of the water purification device of FIG. 1.

FIG. 4 shows a cross sectional view of water purification device 10 with flow arrows indicating the multiple separate flows of water through the water purification device 10. Located within the interior of water purification device 10 is a water passage 60 that extends centrally through water purification device 10 with the elongated slots 15a being in fluid communication with water passage 60. Extending circumferentially around passage 60 are a set of circumferential water inlets 60a that direct water radially outward from passage 60 into an annular chamber 80 wherein water flows thorough water purification materials 70 located in an annular compartment 83 within container 13. In the present embodiment the water purification materials 70 includes a silver ion generating material. In addition zinc or other metals could be used and if desired limestone can be used to maintain the pH of the water. The present invention is well suited for the mineral type dispensers as the minerals can be shielded and protected from debris contamination.

Passage 60 includes a restriction 61 that comprises a radial restriction in flow area through passage 60. The purpose of restriction 61 is to increase the resistance to water flow through passage 81 thus creating a back pressure in region 81 in fluid passage 60 which causes water to flow laterally and radially outward through water inlet 60a and into the water purification material 70. The amount of restriction can be adjusted to maintain the proper flow through the water purification device by increasing or decreasing the diameter of the opening therein. It will be evident that the water flowing though inlet 15a has two routes, a first route straight through the water purification device 10 without contacting the minerals 70 and a second route through the water purification minerals 70.

To illustrate the multiple flow paths of water through the water purification device 10 reference should be made to FIG. 4 which shows a water flow arrow 100. Water flows through primary water inlet 15a and into central chamber 81 in water passage 60. A portion of the water flow is delivered into minerals 70 as indicated by arrow 100a and a further portion, indicated by arrow 100b, flows directly through passage 80 without coming into contact with the water purification materials 70. Thus a portion of the primary flow of water that enters the top of the water purification device flows directly through the water purification device without contacting the water purification materials while a further portion is brought into contact with the water purification materials 70.

Referring again to FIG. 4, a second flow path of water into chamber 80 through inlets 11b is indicated by arrow 101. This portion of water flows downward into minerals 70 without any of the water stream being directed away from the water purification material.

FIG. 4 shows a third source of water flowing into container 13 through the circumferential passage 22 which extends between container 13 and shroud 11. Arrow 102 indicates the direction of flow of water through passage 22 directly into the minerals 70. In each case the water flows through the minerals 70 and is discharged from the container 13 through water outlets 13a located at the lower portion of container 13a as indicated by the arrows extending through outlets 13a. Thus in operation of the invention water can be directed through any of the three set of water inlets with two of the water inlets including either a cover to prevent direct flow of cover into the water inlets and the third water inlet having a recess with an arcuate shape that allow water to be funneled toward the inlet and thereby wash off any debris that may have a tendency to block entry. From the above description it is apparent that in operation two of the three water inlets direct all the water into the minerals 70 while the third inlet directs only a portion of the water into the water purification materials.

While only one set of water inlets could be used to direct water through the water purification device the use of multiple water inlets each of which have some type of mechanism for maintaining the water inlet in a debris free condition greatly enhances the chances of at least some of the water inlets being maintained in an open condition so that water can be continually purified as water flows through the water purification device 10. Thus the water purification device continues to provides enhanced water purification characteristics even though some of the water inlets may become blocked with debris.

Figure 5:
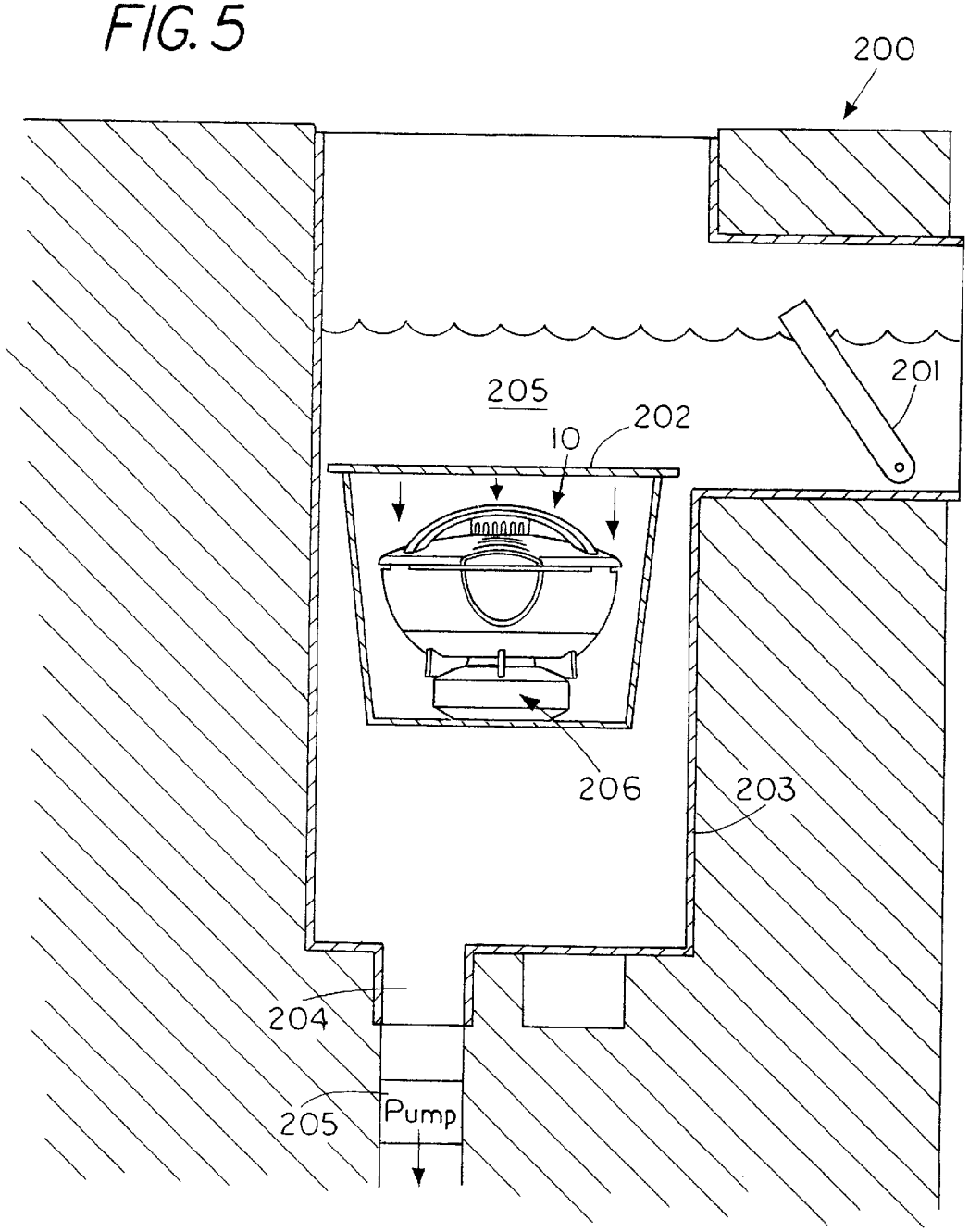
FIG. 5 shows the water purification device located in a skimmer basket in a swimming pool with a bacteria killing puck supporting the water purification device.

FIG. 5 shows the water purification device 10 located in a skimmer basket 202 in a swimming pool 200 with a bacteria killing puck 206 supporting the water purification device. A pivoting gate 201 permits enter of water 205 into skimmer basket 202. A pump 205 pulls water from the bottom outlet 205. In this condition the water impinges normally downward on water purification device 10 as indicated by the arrows with the water dividing and flowing as described in relation to FIG. 4. In this condition, the water purification device can both purify water with minerals as well as dispense chlorine since the water purification device directs a stream of water over the chlorine to provide a controlled release of chlorine.

Figure 6:
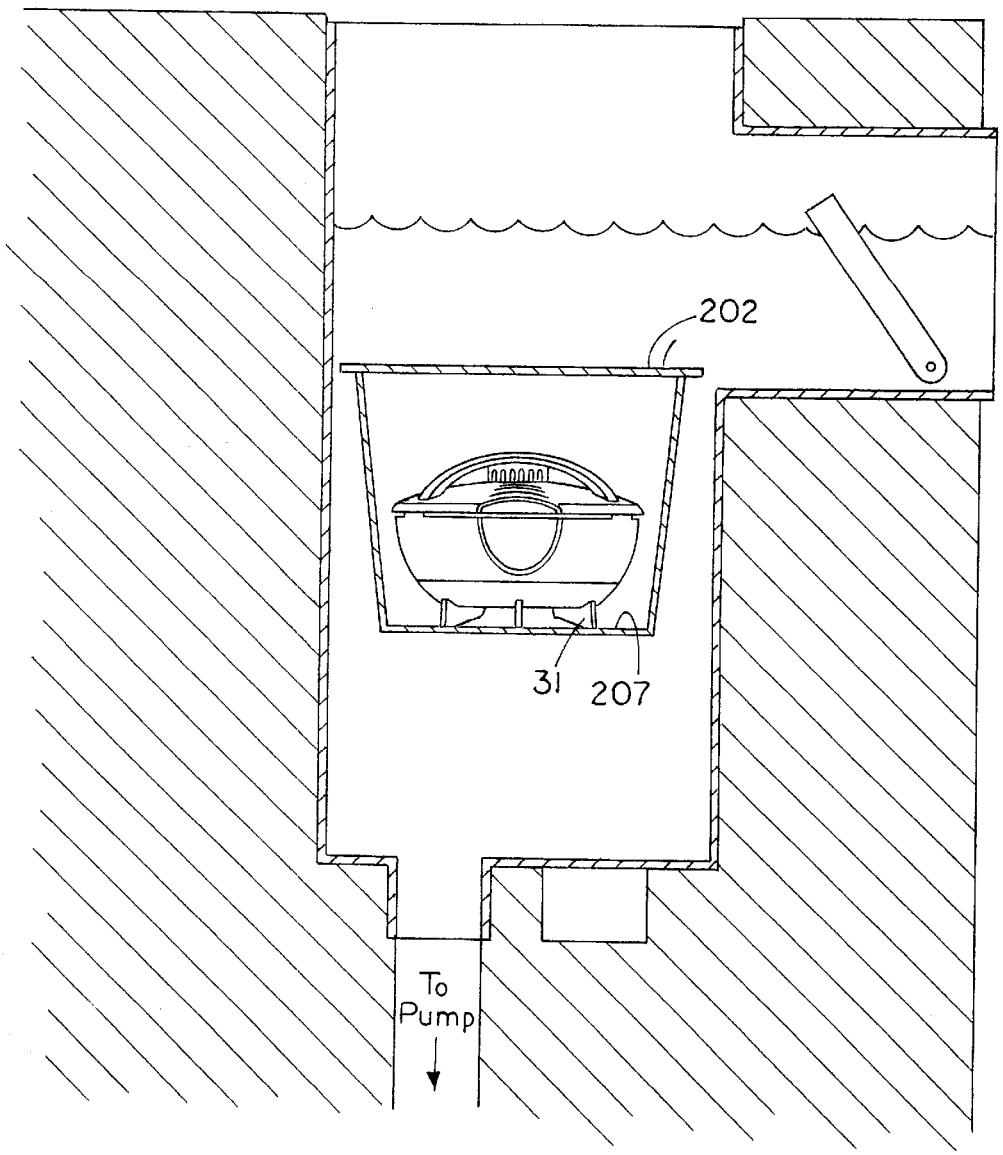
FIG. 6 shows the water purification device positioned in the bottom of a skimmer basket with the top of the water purification device located below the top of the skimmer basket.

FIG. 6 shows the water purification device positioned in an alternate operating condition with the water purification device 10 supported in the bottom 207 of a skimmer basket by legs 31. The top of the water purification device 10 is located below the top of the skimmer basket and the feet 31 support the water purification device 10 above the bottom 207 of skimmer basket to allow flow of water from the water purification device 10 through skimmer basket 10. FIG. 6 is identical to FIG. 5 except that the chemical puck shown in FIG. 5, which is preferably chlorine, has not been included in the system. The advantage of placing puck 205 directly below the water purification devices as shown in FIG. 5 is that it provides a controlled release of chlorine. In addition, debris is prevented from piling on top of the puck 205 by the water purification device 10 which forms an umbrella or shield over the puck. Also, because the internal water passage 60 is large in comparison to the flow paths through the water purification materials one is ensured that a large portion of the fluid stream flows onto the chemical puck thereby liberating the bacteria killing chemical. A further advantage is that a substantially more constant rate of water is directed onto the puck 205 than if the puck were maintained in a free condition in the skimmer basket.

Figure 7:
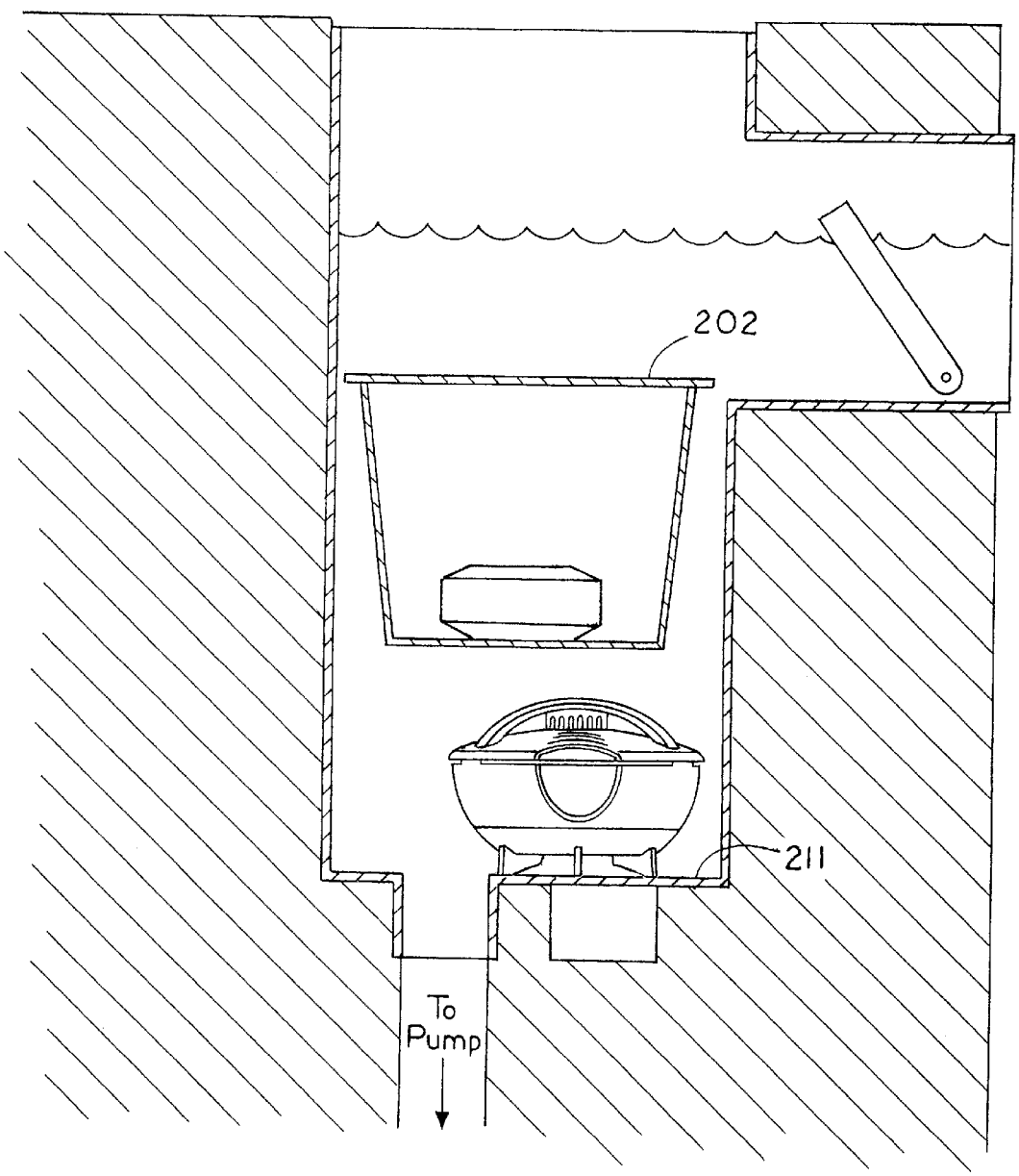
FIG. 7 shows the water purification device located below the skimmer basket in a pool of water with a bacteria killing puck located in the skimmer basket.

While it is preferable to maintain the chemical puck beneath the water purification device in certain applications it may not be necessary to shield the chemical puck. FIG. 7 shows the water purification device 10 can be located below the skimmer basket 202 in a pool of water 205 with a bacteria killing puck 206 located in the skimmer basket and the water purification device 10 located in housing 211 that contains skimmer basket 202. The system of claim 7 allows the maintaining of the bacterial killing chemical puck 31 separate from the water purification device and for maintaining the water purification device 10 in a position where the water is generally cleaner since debris would be collected by skimmer basket 10. Consequently, the present invention while providing for operation in severe conditions also permits the user to employ the water purification device 10 in various operating positions while still maintaining an effective delivery system.

The present invention provides a method of purifying water in a fluid stream containing debris by placing a container 13 with a water purification material 70 therein with the container 13 having a shroud 11 thereover so that the shroud is aligned in a direction at least partially normal to a flow of a stream of water so that at least a portion of the stream of water and debris therein impinges on the shield and is then carried past container 13 and at least a portion of the water stream is separated therefrom so as to flow laterally into the container 13 with the lateral flow of the portion of water inhibiting debris in the water from being carried into the water inlets and thereby inhibiting the obstruction of the water inlets.

The container 13 can be placed either in the skimmer basket or downstream of the skimmer basket. In addition a bacterial killing chemical can be placed beneath the container so that water flowing through a passage in the container impinges on the bacteria killing chemical to kill bacteria.

In order to maintain proper flow through the container one can place a restriction in the passage in the container so as to increase the pressure of fluid in a passage in the container to thereby direct more or less water in a second lateral direction into the container 13.

By forming the shroud 11 of larger diameter than the container 13 the shroud extends radially over the container 13 to thereby cause a further portion water with debris therein to flow over the shroud 11 and past the container 13 while a portion of the water can flow laterally into the container 13 and through the water purification materials 70.

In summary, the present invention provides for effective dispersion of water purification minerals under a variety of adverse conditions as well as providing the user an option to use the water purification device to shield solid chemicals that can be dispensed into the water to help maintain the purity of the water.

The water purification device 10 which is suitable for use in inside or outside of a skimmer basket is shown in Figures to include a water purification mineral 70 located in annular container 13 for holding the water purification minerals 17 with container 13 having an outlet for passage of water therethrough which comprises a set of openings 13a sufficiently small to maintain the minerals 70 in the container from being washed out. A shroud 11 extends over container 13 to deflect debris carried by the water away from the container 13. A first lateral water inlet 15a comprised of vertical elongated openings directs a portion of water flowing thereto into the water purification mineral container 13 and a further portion through the container 13 without contacting the water purification mineral 70. The cover 11, which extends over first water inlet 15a, inhibits debris from blocking first water inlet 15a. The second lateral water inlet which is comprised of circumferential lateral inlet 22 directs a different portion of water beneath the shroud 11 and into the water purification mineral 70 in the container and a third lateral water inlet comprised of shroud water inlets 11a, 11b and 11c, which are recessed in the shroud, direct a still different portion of water into the water purification minerals 70 so that water flowing through the water purification device 10 enters in discreet portions at multiple different locations in water purification device 10 with each of the three multiple different locations are at different vertical elevations on the water purification device 10.

We claim:

1. A water purification device suitable for placement in a stream of water containing debris comprising:
    a water purification material;
    a container for holding the water purification material, said container having an outlet for passage of water therethrough while maintaining the water purification material in the container;
    a shroud, said shroud extending over said container to deflect debris away from said container;
    a first water inlet, said first water inlet directing a portion of water flowing thereto into the water purification material in the water purification material container and a further portion through the container without contacting the water purification material; and
    a cover, said cover extending laterally over said first water inlet to inhibit debris from blocking said first water inlet while allowing water to flow around said cover and through said water purification device while debris is carried past said first water inlet.

2. The water purification device of claim 1 including a second water inlet wherein the shroud extends over the container and the second water inlet is located laterally inward of the shroud for directing water radially inward beneath the shroud while allowing debris to flow therepast.

3. The water purification device of claim 2 wherein the shroud extends radially outward over a circumferential lip of said container to provide a shield of the second water inlet so that the momentum of any debris in the water tends to cause the debris to flow past the second water inlet while a portion of the water flows laterally into the container through the second water inlet.

4. The water purification device of claim 2 including a third water inlet located in said shroud for directing a portion of a fluid stream through said container.

5. The water purification device of claim 4 wherein the shroud has a dome shape to deflect debris thereover and said third water inlet is recessed in said shroud so that the momentum of debris in the water can carry the debris past the third outlet while water flows laterally inward into the container.

6. The water purification device of claim 5 wherein the shroud includes a plurality of scallops for directing water and debris over said shroud to wash debris away from said third water inlet.

7. The water purification device of claim 6 wherein the third water inlet has an arcuate shape to deflect debris away from said third water inlet.

8. The water purification device of claim 7 wherein the third water inlet comprise a plurality of inlet ports located in a radially spaced position from each other with each of the inlet port positioned in a recess to inhibit debris from flowing into the third water inlet.

9. The water purification device of claim 1 wherein the water purification material comprises a silver containing material.

10. The water purification device of claim of claim 9 wherein the water purification material contains limestone.

11. The water purification device of claim 10 wherein the water purification material contains zinc.

12. The water purification device of claim 1 wherein the cover comprises a handle for removing or inserting said water purification device.

13. The water purification device of claim 1 wherein the water purification device includes spaced apart legs with feet thereon located on an underside of the water purification device with the feet supporting said water purification device in an upright stable position to permit water to enter a top of said water purification device and be discharged from the underside of said water purification device.

14. The water purification device of claim 13 wherein the water purification device legs include radial supports for supporting the water purification device on a solid water purification puck.

15. The water purification device of claim 1 wherein the first water inlet includes a central passage having a restriction therein for increasing the pressure of the flowing water in the passage to thereby direct a portion of water flowing through the passage into the container.

16. The water purification device of claim 1 wherein the container has an annular shape with a fluid passage centrally located in said container.

17. The water purification device of claim 16 wherein the fluid passage includes lateral passages for directing water into the container so that water flowing into said container must flow laterally in at least two directions to thereby inhibit debris from accumulating beneath the container.

18. The water purification device of claim 16 wherein the first water inlet comprises a series of elongated openings extending from said passage to above said shroud to allow for flow of water therethrough.

19. The water purification device of claim 1 wherein water purification device comprises a polymer plastic.

20. The water purification device of claim 1 wherein the water purification material comprises a silver ion generating material.

21. A water purification system comprising:
    a skimmer for screening debris from a stream of water, said skimmer including a plurality of openings for passage of water therethrough while preventing debris from flowing therethrough;
    a water purification material;

a water purification device comprising a container for holding the water purification material, said container having an outlet for passage of water therethrough while maintaining the water purification material in the container, said container located in said skimmer;

a shroud, said shroud extending over said container to deflect debris away from said container;

a first water inlet, said first water inlet directing a portion of water flowing thereto into the water purification material container and a further portion through the container without contacting the water purification material; and a cover, said cover extending over said first water inlet to inhibit debris from blocking said first water inlet while allowing water to flow around said cover and through said water purification device with said water purification device positioned in the stream of water flowing through the skimmer.

22. The water purification system of claim 21 wherein the water purification material comprises a material containing silver.

23. The water purification system of claim 22 wherein the water purification device includes a water purification puck for supporting the water purification device on said skimmer.

24. The water purification system of claim 21 wherein the water purification device is located below said skimmer.

25. The water purification system of claim 24 wherein a water purification puck is located in said skimmer.

26. A water purification device comprising:

a water purification mineral;

a container for holding the water purification minerals, said container having an outlet for passage of water therethrough while maintaining the water purification minerals in the container;

a shroud, said shroud extending over said container to deflect debris away from said container;

a first lateral water inlet, said first lateral water inlet directing a portion of water flowing thereto into the water purification mineral container and a further portion through the container without contacting the water purification mineral;

a cover, said cover extending over said first water inlet to inhibit debris form blocking said first water inlet;

a second lateral water inlet for directing water a different portion of water beneath the shroud and into the water purification mineral in the container; and a third lateral water inlet, said third lateral water inlet located in said shroud, said third water inlet recessed from said shroud for directing a still different portion of water into the water purification minerals so that water flowing through said water purification device enters in discreet portions at different locations in said water purification device.

\* \* \* \* \*